Dec. 18, 1951 F. M. VAN DEVENTER 2,579,218
ADJUSTABLE LOADING DEVICE FOR VALVES AND THE LIKE
Filed Sept. 29, 1948 2 SHEETS—SHEET 1

INVENTOR.
FRANK M. VAN DEVENTER.
BY
Albert J. Henderson
his ATTORNEY.

Dec. 18, 1951   F. M. VAN DEVENTER   2,579,218
ADJUSTABLE LOADING DEVICE FOR VALVES AND THE LIKE
Filed Sept. 29, 1948   2 SHEETS—SHEET 2
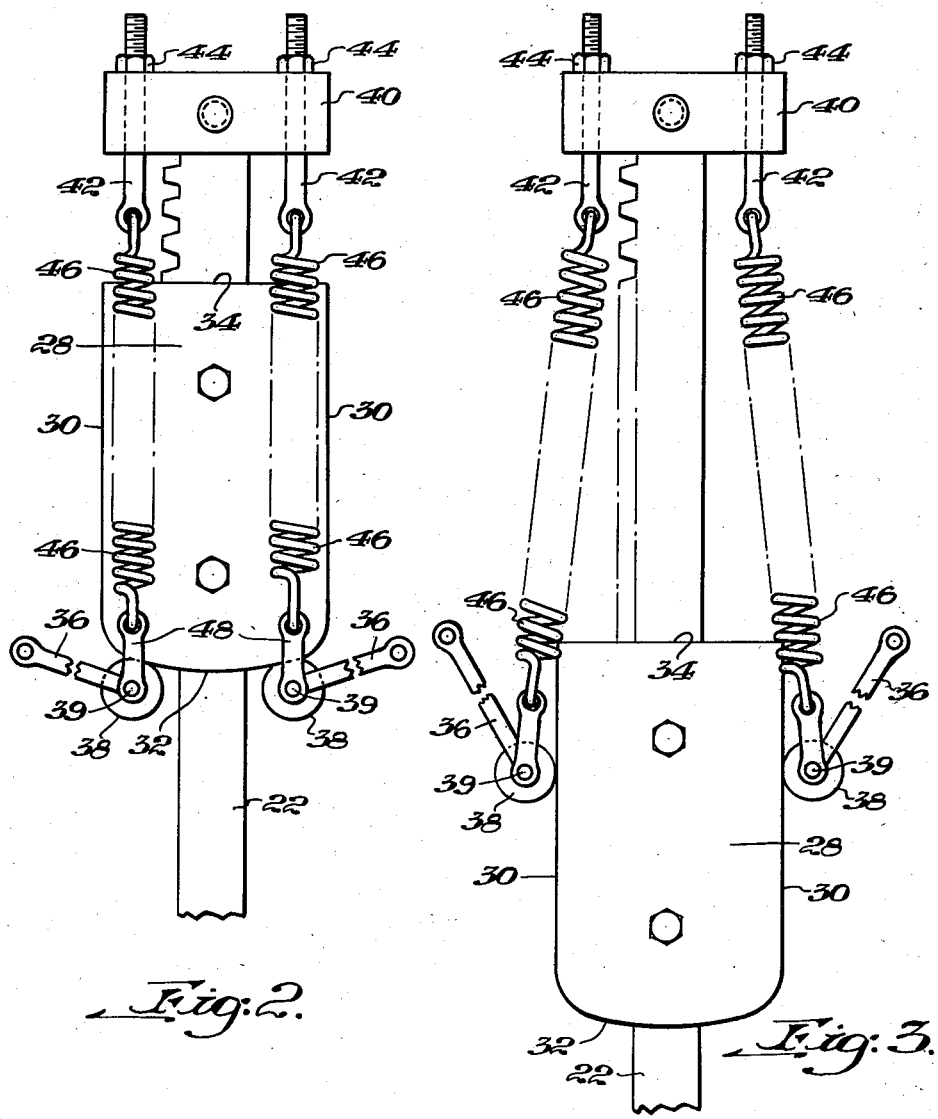
INVENTOR.
FRANK M. VAN DEVENTER.
BY
his ATTORNEY.

Patented Dec. 18, 1951

2,579,218

UNITED STATES PATENT OFFICE 2,579,218

ADJUSTABLE LOADING DEVICE FOR VALVES AND THE LIKE

Frank M. Van Deventer, Westfield, N. J., assignor, by mesne assignments, to Walworth Company, New York, N. Y., a corporation of Massachusetts Application September 29, 1948, Serial No. 51,798

2 Claims. (Cl. 74—527)

This invention relates to adjustable loading means for valves and like devices having a pair of relatively movable parts to be restrained from movement until a predetermined force is exerted.

The invention finds a wide field of usefulness and is particularly adapted for use with automatic hydraulically or pneumatically operated valves controlling gas or other fluid transmission systems. In such services the valves are normally held open and will remain open despite normal line pressure variations on the operating cylinder. However, in the case of a pipe failure causing the line pressure to drop abruptly, the closing action of the operating cylinder is relatively slow due to the interposition of chokes and like devices.

A common practice is to install such valves at approximately ten mile intervals to permit isolating a relatively short length of line in case of pipe line failure. Hence, it is important that all valves have as nearly similar operating characteristics as possible so that only the valve nearest the failure will close automatically. In practice this desideratum does not obtain due to uncontrollable variations inherent in the valve parts requiring different closing efforts to be applied. In view of the differences found in valves of equal size it is apparent that valves of unequal sizes would be even less identical in operating characteristics. Frequently, however, during the building of large gas lines several small valves are used in certain locations in place of the larger sizes found in other locations.

An object of this invention is to adjust the operating sensitivity of valves or other devices to meet desired optimum requirements.

Another object of the invention is to automatically restrain the valves from undesired movement without interference with normal operation.

Another object of the invention is to remove the restraining load immediately upon the occurrence of normal valve movement.

Another object of the invention is to render the improvement applicable to existing valves without requiring extensive alteration therein.

Another object of the invention is to apply the improvement to installed valves without dismantling the same or unpressuring of the pipe line or causing interference with continuous functioning of the installation.

Another object of the invention is to include both longitudinally reciprocable valves and rotatable valves or other devices as subject to the sensitivity adjustment.

Other objects and advantages will become apparent in the following description taken in connection with the accompanying drawings wherein:

Fig. 2 is an enlarged plan view of an operating portion of the valve having the invention applied thereto and Fig. 3 is a view similar to Fig. 2 but showing the parts in another position of operation.

Figure 1:
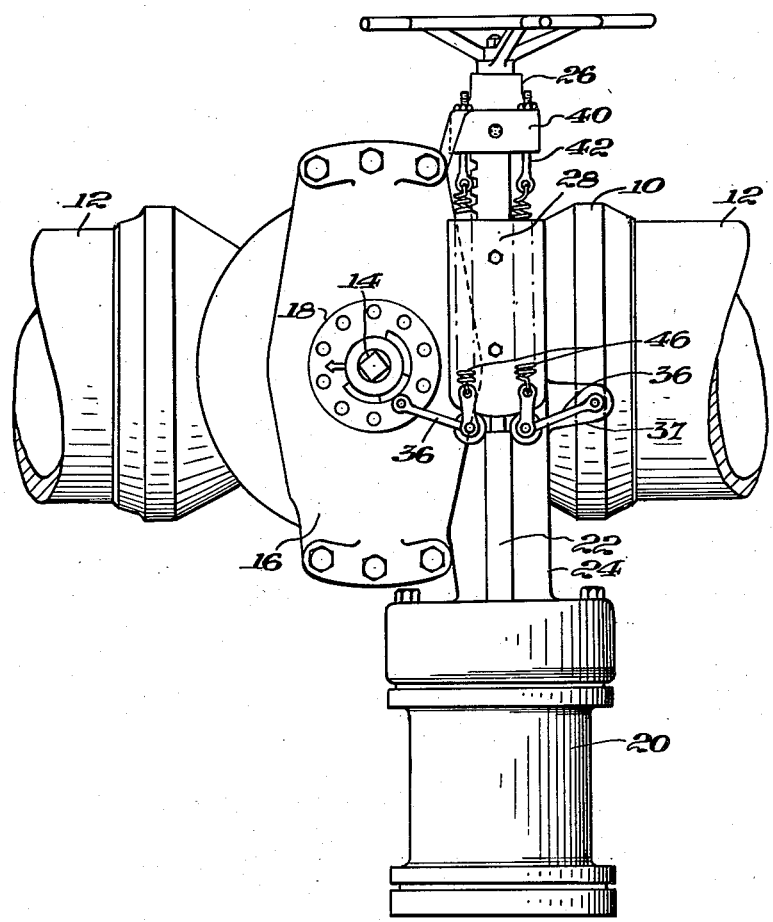
Fig. 1 is a plan view of an automatically operated pipe-line valve having the invention applied thereto.

Referring more particularly to the drawing Fig. 1, the valve body 10 has its opposite ends connected to a pipe line 12 wherein the flow of fluid is to be controlled. In this embodiment, the valve is of the rotatable plug type having its operating stem 14 projecting through a valve yoke 16 which is provided with a bolted cap member 18 surrounding the stem 14. By the interposition of the suitable gearing (not shown) the operating stem 14 is adapted to be rotated by the operation of a hydraulic or pneumatic cylinder 20 carrying the usual reciprocable gear rack 22 both of which are supported on a cylinder support 24 from the yoke 16. The end of the gear rack 22 opposite the cylinder 20 is suitably mounted in a bearing support 26 carried by the cylinder support 24 for this purpose. As the remaining details of the construction of such hydraulically operated valves are well known to those skilled in the art and play no part in the principles of this invention further description is deemed unnecessary. It will be understood, however, that the yoke 16, cylinder support 24 and the bearing support 26 are stationary relative to the gear rack 22 during automatic operation of the valve.

As previously indicated, the operating sensitivity of the valve can be increased by applying restraining means for the relatively movable parts previously described. To this end a generally rectangular thrust element 28 in the form of a metal plate is shown as bolted to the gear rack 22 although it could be attached to any portion of the mechanism which moves in unison with the valve stem 14 or its operating apparatus. The thrust element 28 is provided with a bearing edge surface consisting of two oppositely disposed portions 30 extending substantially parallel with each other in the direction of the movement of the gear rack 22 and a curved connecting portion 32 extending substantially normal to the oppositely disposed portions 30. Preferably, the oppositely disposed portions 30 extend on either side of the gear rack 22 due to the greater width of the thrust element 28 and this element is located lengthwise of the gear rack 22 so that the edge 34 thereof opposite the portion 32 terminates short of the projecting end of the gear rack 22 which is supported in the bearing support 26.

A pair of rotatable arms 36 are adapted for pivotal mounting at one end thereof respectively on a stationary portion of the valve. In this embodiment, the arm 36 on the left-hand side of the gear rack 22, as viewed in the drawing, is pivotally mounted on the bolted cap 18 of the yoke 16 while the other arm 36 is pivotally mounted on a lug 37 or other projection on the support 24. It will be understood that any other suitable means of pivotally mounting the arms 36 could be employed in place of that described and shown herein.

Engaging means in the form of a pair of rollers 38 is provided for the bearing edge of the thrust element 28. The rollers 38 may conveniently be mounted on pins 39 carried by the arms 36 at the ends opposite the pivotal mounting thereof. Thus, while the arms 36 and rollers 38 rotate as a unit about the stationary mounting of the arms 36, the rollers 38 also rotate about the pins 39 independently of the arms 36.

In order to retain the rollers 38 in operative engagement with the bearing edge of the thrust element 28 a yieldable mounting means is employed. Thus, a toggle member 40 is pivotally mounted intermediate its ends on the bearing support 26 and thereby spaced from the edge 34 of the thrust element 28. Projecting through the toggle member 40 on opposite sides respectively of the gear rack 22 is a pair of eye bolts 42 provided with nuts 44 cooperable with the toggle member 40 and constituting adjusting means for the loading mechanism. A pair of coil springs 46 secured one in each of the eye bolts 42 at one end of each spring 46 initially extend substantially parallel with each other and with the oppositely disposed portions 30 of the thrust element 28. The opposite end of each of the coil springs 46 is secured respectively in a pair of links 48 carried on the pin 39 as a pivotal mounting therefor.

It will be understood that in the construction shown and described the coil springs 46 overlie the thrust element 28 wherefore the rollers 38 are off-set from the plane of the coil springs 46 in order to suitably cooperate with the bearing edge of the thrust element 28. It is within the scope of this invention to provide another pair of coil springs 46 on the opposite side of the thrust element 28 in order that the rollers 38 can be supported on either side of the thrust element 28 if desired. By rotating the nuts 44 it is apparent that the tension of the coil springs 46 can be readily be adjusted and the rollers 38 made to exert any desired frictional effort on the curved connecting portion 32 of the thrust element 28 in the initial position of the parts.

The operation of the device will be apparent from the drawings Figs. 2 and 3, the mechanism being shown in Fig. 2 in its normal position, that is, in the open position of the valve. As long as the rollers 38 frictionally engage the curved connecting portion 32 under tension of the coil springs 46, the device operates positively to restrain any motion of the gear rack 22 during normal fluctuations of pressure in the cylinder 20. However, upon sufficient force being applied to the rollers 38 and the coil springs 46 by the thrust element 28 during a valve closing operation of the gear rack 22 such as would be encountered during a pipe line breakage then the restraining means is overcome and the thrust element 28 will serve to force the rollers 38 apart. Such separation of the rollers 38 is permitted due to the pivotal mounting of the arms 36 and the linkage 48 while some extension of the springs 46 occurs.

As shown in Fig. 3 of the drawings, the rollers 38 are positioned in operative engagement with the oppositely disposed portion 30 of the thrust element 28 during the relative movement of the gear rack 22. However, no appreciable further extension of the springs 46 occurs and no restraint on the relative movement is exerted by the loading mechanism. The motion of the gear rack 22 causes the valve finally to reach the closed position with the parts in the positions shown in Fig. 3 of the drawings. The structure is designed as to the shape of the edge bearing surface and the proportions of the yieldable means which are so interrelated that the restraining action will cease almost immediately the gear rack 22 starts to move. Consequently, the loading mechanism acts as a leash in holding the gear rack 22 from initiating a closing cycle but this leashing effect is eliminated when sufficient force is exerted to cause the closing movement. It is apparent that all the valves in a given installation can be adjusted to have approximately identical operating sensitivity by use of the principles of this invention.

While the invention has been shown as applied to a plug type valve having translative operating motion as represented by the gear rack 22, it will be apparent that the restraining effect could effectively be employed on rotative movement also. Thus, the thrust element 28 could be attached to the rotating portion of the plug type valve and the bearing edge generated so as to offer the desired restraint to motion in the open valve position and immediate relief from such restraint after rotation commences. Moreover, while plug type valves have been described the invention may be adapted with equal facility to gate valves when operated either by a pneumatic or hydraulic cylinder, the parts being essentially as illustrated and described herein. It is also contemplated that either plug, globe, or gate type valves may be operated by geared mechanisms such as electric motors or air motors of the vane or turbine type. In these cases, the restraining mechanism could be applied either to the valve itself or to some portion of the operating device as will be apparent from this disclosure.

It will be understood that many changes may be made in the arrangement of parts and details of construction disclosed herein without departing from the scope of the invention as defined in the appended claims.

I claim:

1. Restraining means for devices having a pair of relatively movable parts, comprising a thrust element adapted to be carried on one of said parts and having an edge bearing surface, said edge having two oppositely disposed elongated portions extending substantially parallel with each other in the direction of said relative movement and a relatively short connecting portion extending substantially normal thereto, a pair of engaging means each adapted for pivotal mounting on the other said part and to be positioned for cooperation with said bearing surface, and a pair of yieldable means adapted to be carried by the other said part and secured respectively to said engaging means, said yieldable means initially extending substantially parallel with each other and with said oppositely disposed portions for biasing said engaging means in one direction of said relative movement for maintaining said engaging means cooperable with said relatively short connecting portion and restraining said relative movement, said bias of said yieldable means being adapted to be overcome by said thrust element exerting force on said engaging means sufficiently to permit passage of said thrust element thereby during said relative movement and releasing said thrust element from further restraint by the subsequent positioning of said engaging means for cooperation with said oppositely disposed portions during said movement.

2. Restraining means for devices having a pair of relatively movable parts, comprising a generally rectangular thrust element adapted to be carried on one of said parts and having an edge bearing surface, said edge having two oppositely disposed elongated portions extending substantially parallel with each other in the direction of said relative movement and a relatively short curved connecting portion extending substantially normal thereto, a pair of rotatable arms adapted for pivotal mounting at one end thereof on the other said part, a pair of rollers mounted one on each of the opposite ends of said arms, a toggle member adapted for pivotal mounting intermediate its ends on said one part adacent the end of said thrust element opposite said connecting portion, a pair of adjusting means carried by said toggle member for location on opposite sides of said one part, and a pair of yieldable means each connected at one end to one of said adjusting means respectively and at the opposite end to said opposite end of said arms for initially extending substantially parallel with each other and with said oppositely disposed portions, said yieldable means initially exerting a tension in one direction of said relative movement for maintaining said rollers in operative engagement with said relatively short connecting portion sufficiently for restraining said relative movement, said tension being overcome and said rollers being thereby spread apart by rotation of said arms when said thrust element exerts force on said rollers sufficiently to permit passage of said thrust element therebetween during said relative movement and releasing said thrust element from further restraint by the subsequent operative engagement of said rollers with said oppositely disposed elongated portions respectively of said surface during said movement.

FRANK M. VAN DEVENTER.

REFERENCES CITED

The following references are of record in the file of this patent:

UNITED STATES PATENTS

| Number | Name | Date |
|---|---|---|
| 983,610 | Dooley | Feb. 7, 1911 |
| 1,157,236 | McElroy | Oct. 19, 1915 |
| 1,768,625 | Olsen | July 1, 1930 |
| 2,169,049 | Hunter | Aug. 8, 1939 |